Inventor
F. A. Maimone
By Clarence A. O'Brien
Attorney

April 9, 1929.  F. A. MAIMONE  1,708,367
CORN HULLER
Filed Nov. 11, 1925   2 Sheets-Sheet 2

Inventor
F. A. Maimone
By Clarence A. O'Brien
Attorney

Patented Apr. 9, 1929.

1,708,367

UNITED STATES PATENT OFFICE.

FRANCISCO A. MAIMONE, OF LOS TEQUES, VENEZUELA.

CORN HULLER.

Application filed November 11, 1925. Serial No. 68,259.

This invention relates to improvements in corn hulling devices and more particularly to a portable corn huller adapted for manual operation and for home use in hulling corn for the preparation of corn meal from which corn bread is to be made.

An object of the invention resides in providing a small portable corn huller adapted for manual operation which includes a cylindrical drum formed in half sections in which is rotatably mounted a drum so that the corn to be hulled is fed between the drum and the casing which are each provided with outer and inner linings respectively having a plurality of hulling teeth thereon adapted by the rotation of the drum, to engage and cut the hulls or shells from the grains of corn therein which are discharged through the slotted portion of the lower half of the casing.

The invention includes numerous other objects residing in the details of construction and in the arrangement of the parts for carrying out the essential features of the invention which are hereafter more particularly pointed out in the detailed description and claim directed to a preferred form of the invention, it being understood, however, that various changes in the size, shape and arrangement of the parts may be made without departing from the spirit or scope of the invention as herein set forth In the drawings forming part of this application Figure 1 is an end elevation of the improved corn huller.

Figure 1:
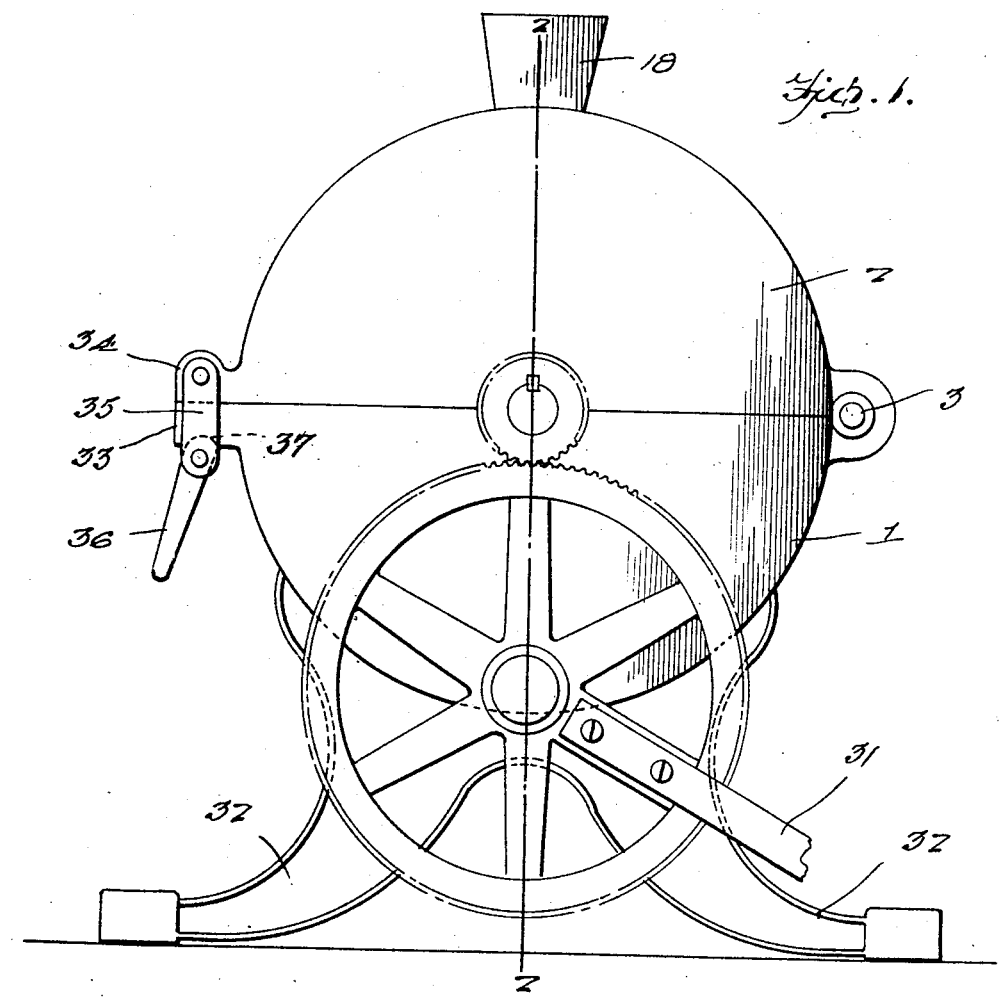
Figure 3:
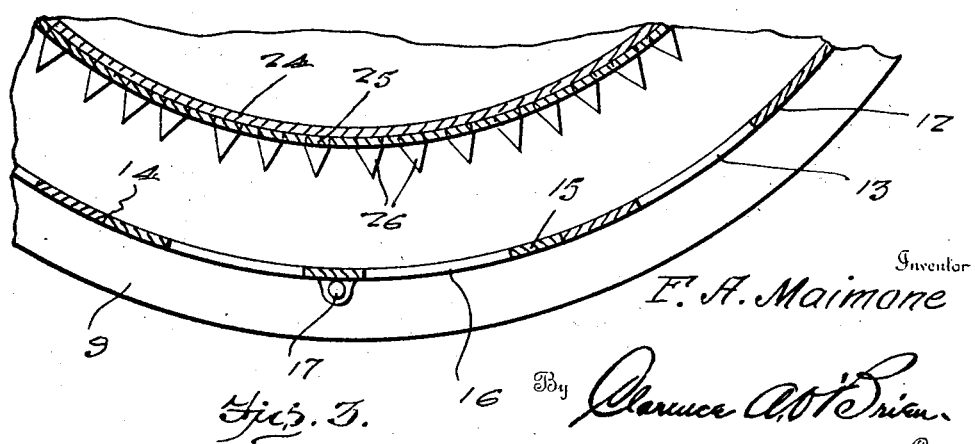
Fig. 3 is a transverse sectional view thru the lower portion of the casing and drum, showing the slotted portion of the casing.
Figure 2:
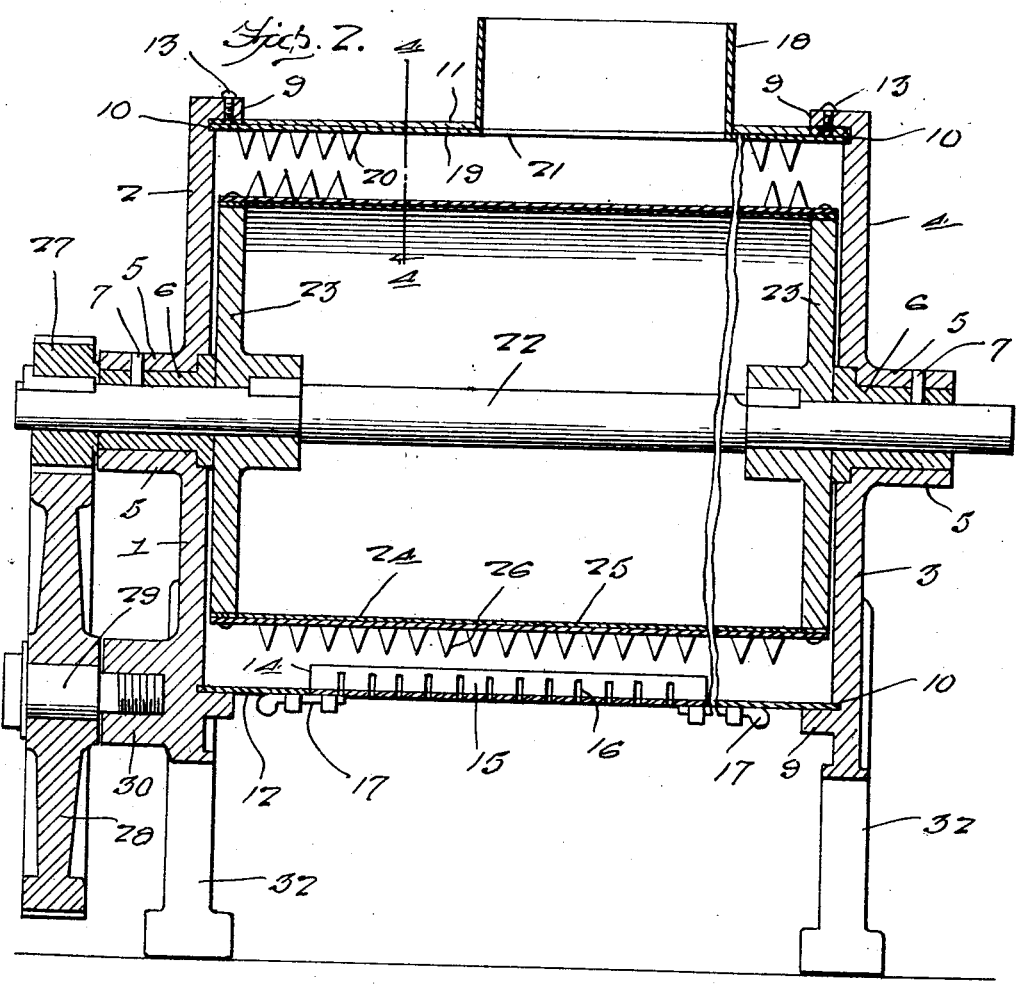
Fig. 2 is a vertical longitudinal sectional view therethrough, taken on line 2—2 of Fig. 1.
Figure 4:
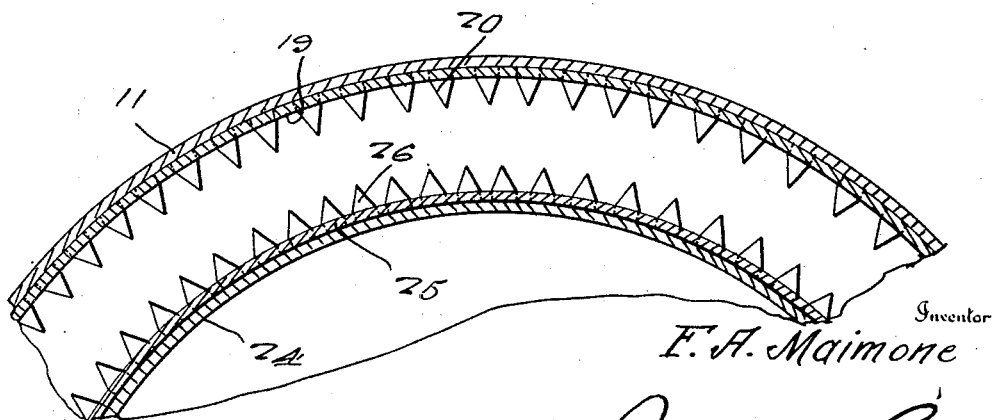
Fig. 4 is an enlarged detail sectional view taken on line 4—4 of Fig. 2 showing the relation of the upper portion of the drum and the casing.

1 indicates the lower end member at one end of the machine which has an upper end member 2 pivotally connected thereto at 2' adapted to form a cylindrical end member while the opposite end of the machine is provided with similar but oppositely formed end members 3 and 4 respectively.

These end members are formed in the central portion with bearing retaining portions 5 adapted to cooperate for removably retaining the bearing sleeves 6 therein which are held against rotation by the pins 7. The arcuate edges of each of the end forming sections for the device are formed with laterally extending flanges 9 on the inside of which are annular grooves 10 which are adapted to receive casing sections 11 and 12 respectively which form the upper and lower half of the outer casing for the machine.

Suitable screws 13 may be threaded through the flanges 9 and the end portions of the casing sections 11 and 12 for receiving the end forming members and the casing sections in assembled relation.

The lower casing section 12 is formed with a plurality of rows of elongated slots 12' in the bottom portion, while the portion of this casing immediately at the bottom of the same is provided with an opening 14 for receiving the door section 15 also formed with a plurality of slots 16, so that upon removal of the door through the operation of the latch member 17 of any suitable character, the interior of the casing may be cleaned after the grinding of one charge of corn and before the filling of the casing with another charge.

The upper casing section 11 is formed with a hopper 18 opening into the interior of the casing for receiving and feeding charges of corn to be hulled into the machine. A piece of steel sheet material 19 is mounted in the upper half of the casing adjacent to the casing section 11 having the edges mounted in the grooves 10 and is formed with a plurality of struck-out breaker points 20 projecting radially inward therefrom.

This lining sheet 19 which forms the stationary cutter or breaker member is formed at 21 with an opening registering with the lower end of the hopper 18. The sheet 19 is secured in position when the section 11 and the sections 2 and 4 respectively are secured together through the edges seating in grooves 10 as above described.

A shaft 22 is rotatably mounted in the bearing sleeves 6 and within the casing mounts the annular disk members 23 suitably keyed thereon and on which is mounted a main cylinder 24 which is provided with a cylindrical sheet member or breaker member 25 formed with a plurality of outwardly struck formed breaker points 26. These breaker points 26 are rotatable with the drum and in the rotation thereof it will be seen that a cooperation will take place between these breaker points and those of the stationary members indicated by the numeral 20 which will produce the hulling operation on the grains of corn supplied to said casing.

The end of the shaft 22 is provided with a pinion 27 intermeshed with the gear 28 mounted on the stub shaft 29 carried by the sections 30 formed on the end section 1. This gear 28 receives an operating handle 31 so that the shaft 22 may be suitably manually rotated by the operation of the handle. The end sections 1 and 3 are formed with suitable leg extensions 32 to form a suitable support for the machine assembly.

The meeting edges of the end sections 1 and 2 and 3 and 4 respectively are each formed with projections 33 and 34 respectively, the projection 34 pivotally mounting the link member 35 which carry the locking levers 36 adapted to engage the recesses 37 in the projections 33 so that the casing sections and the end members are retained in closed position during the operation of the device.

Upon the supplying of a charge of corn to be hulled through the hopper 18 and the rotation of the drum in the manner as above set forth, the breaker points 26 and 20 will cooperate to cut and break the shell from the grains of corn which will be chipped off or cut off in small pieces and in the rotation of the drum will be discharged through the slots 13 and 16 formed in the bottom casing section 11, and the door section 15, so that after the hulling operation during which the hulls are being discharged through the slots in the bottom portion of the casing may be received in a suitable container placed under the machine, the door 15 may be removed, and the hulls of corn taken from the machine in proper condition for grinding in order to make the corn meal for the purpose of producing corn bread.

This machine is designed particularly for use in homes where corn bread is used instead of wheat bread or white bread, and provides a means whereby the users of this form of bread may conveniently hull their own corn.

Having thus described my invention, what I claim as new is:—

A corn huller, comprising a stationary casing member formed of semi-cylindrical sections hingedly connected at one side, a breaker member formed of sheet material having a plurality of breaker points projecting from one side thereof formed from said sheet, said breaker member being secured in one of said casing sections with the projections extending inwardly, said casing sections being formed with cooperating bearing portions at the opposite end thereof, a drum rotatably mounted in the cooperating bearing portions of said casing, a breaker member mounted on said drum formed of sheet material having outwardly struck projections for cooperation with the breaker points on the first mentioned breaker member, said other casing member having a door section removably secured therein affording access to the interior of the casing and provided with a plurality of slotted openings arranged in rows extending circumferentially with respect to the casing whereby to discharge the hulled corn therefrom.

In testimony whereof I affix my signature.

FRANCISCO A. MAIMONE.